UNITED STATES PATENT OFFICE.

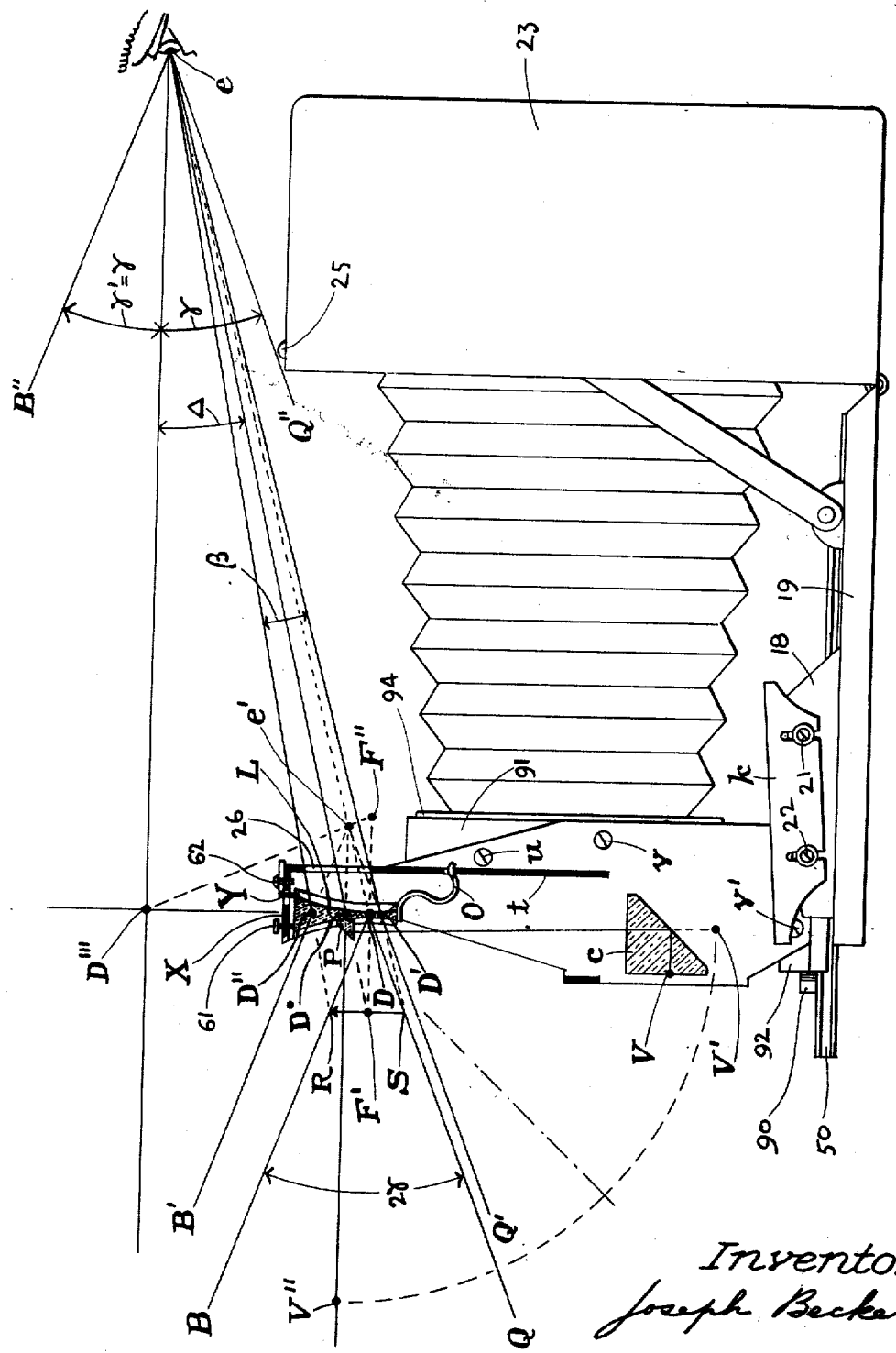

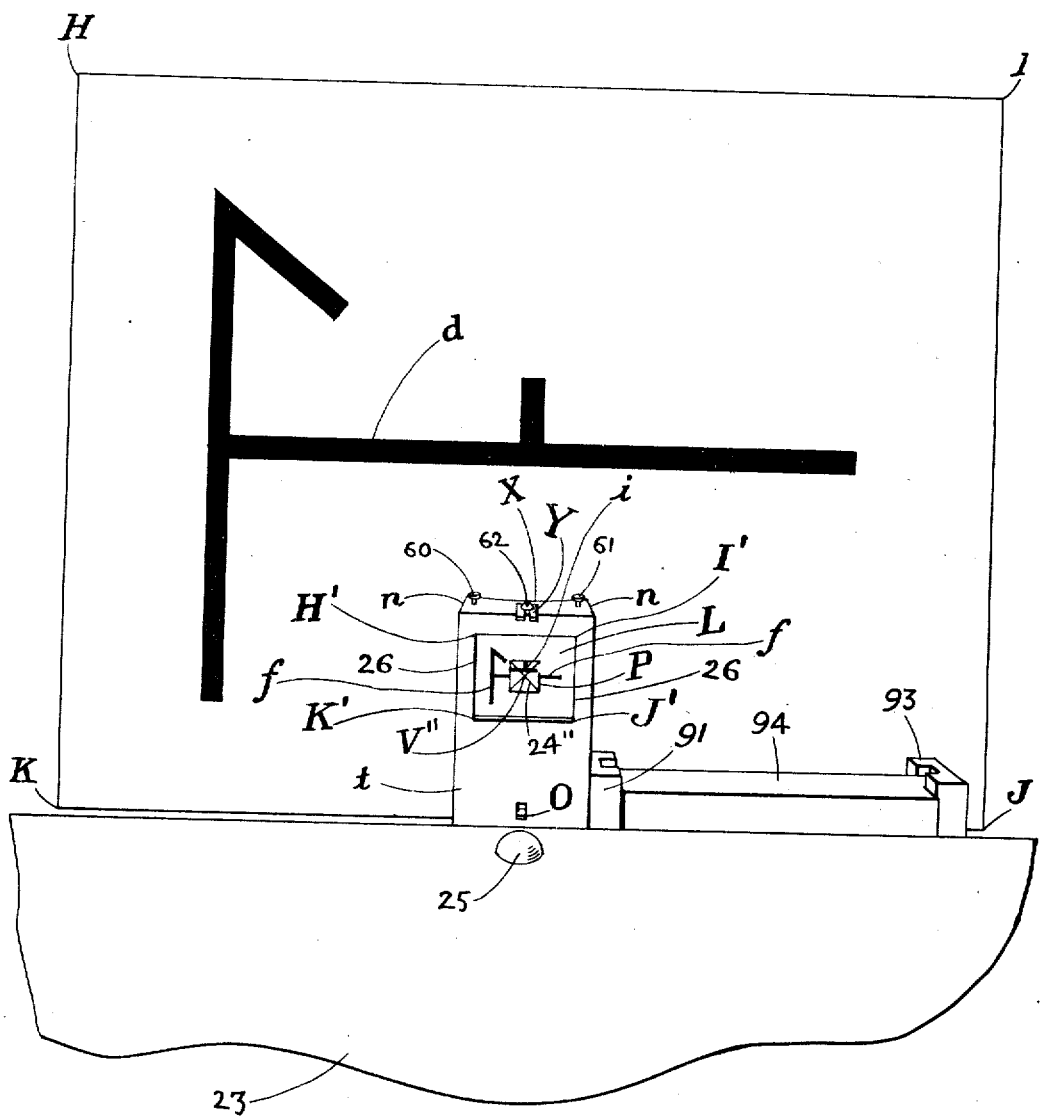

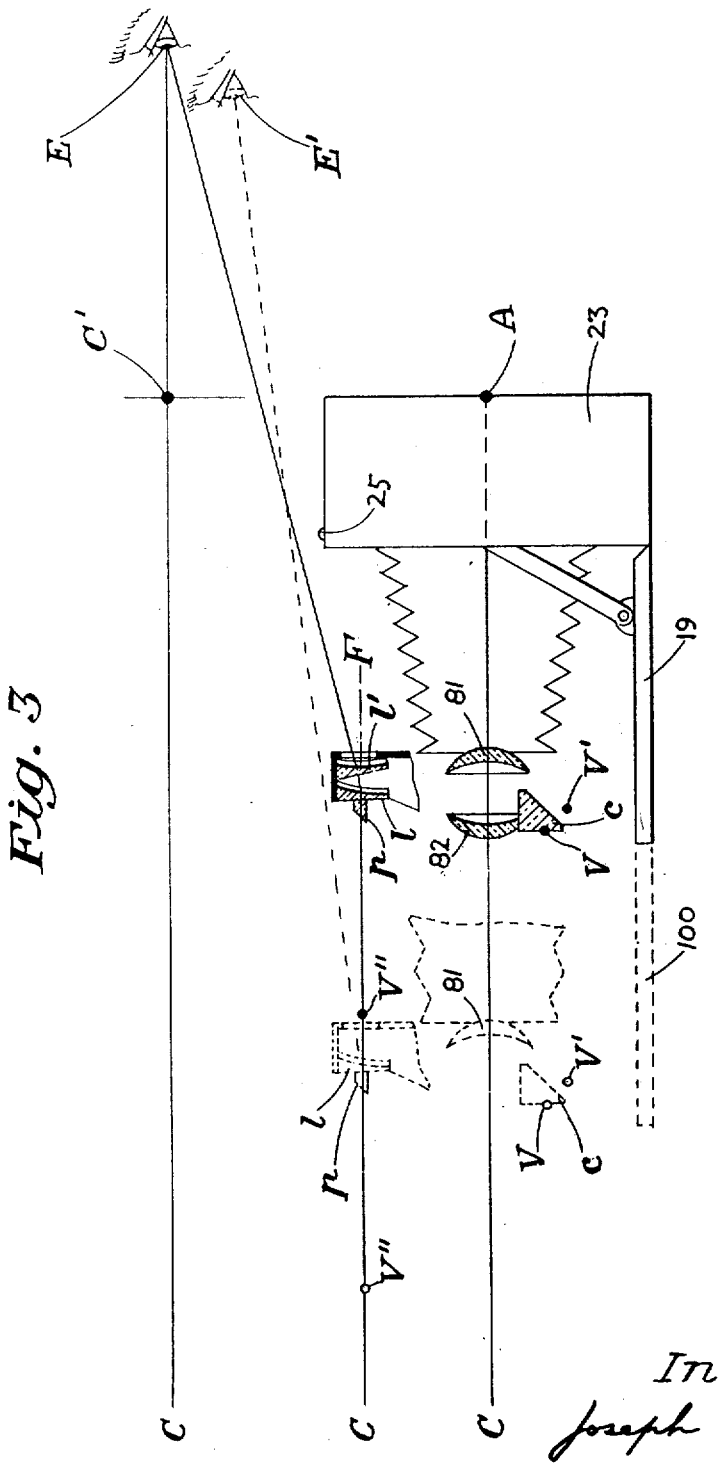

JOSEPH BECKER, OF WASHINGTON, DISTRICT OF COLUMBIA.

FINDER.

1,210,134. Specification of Letters Patent. Patented Dec. 26, 1916.

Original application filed June 4, 1901, Serial No. 63,106. Divided and this application filed March 31, 1916. Serial No. 87,977.

*To all whom it may concern:*

Be it known that I, JOSEPH BECKER, a citizen of the United States, residing at Washington, in the District of Columbia, have invented new and useful Improvements in Finders, of which the following is a specification.

The present patent application, identified for convenience of reference in my related applications and patents as Case Ah, is filed as a division of my prior application, Case C, Serial No. 63,106, filed June 4, 1901, now Patent 1,178,476, issued April 4, 1916.

The present invention relates to camera finders of the direct-vision-divergent-lens type, and it consists mainly in so mounting a divergent lens that an eccentric part thereof shall serve as finder in place of the centric part heretofore used.

My eccentric lens finder has substantially the same height and width as if it were of the same focal length and centric, and it forms substantially the same erect finder image as if it were centric; but it has, in addition to the well known advantage of the centric divergent lens finder, two other very important advantages, to wit: First, the advantage of not covering and concealing the object that is viewed in the finder; secondly, the advantage of not projecting beyond the general outline of the camera. My finder lens, therefore, does not have to be raised for use, as is necessary with the centric lens; and it forms the finder image directionally close by the original object, so that the operator may see both the object and its image, at the same time, and may concentrate his attention either on the object or on its finder image, at will, without moving his head, by a mere turn of the eyeball.

A divergent lens, whether centric or eccentric, is not complete as a finder without means for directing the line of sight, and this means is arranged so that the line of sight from the eye to the center of the finder image shall have a certain direction with reference to the principal axis of the camera lens. In the well known centric divergent lens finder this line of sight is parallel to the principal axis of the camera lens; but in my eccentric lens finder it is decidedly inclined.

The sight directing means used in the present embodiment of my invention is not the simplest, because it was specially contrived for coöperation with the other optical elements that compose the combined focus and field finder of my said Case C, and it will, therefore, be understood that much simpler sight directing means may be used.

In the accompanying drawings: Figure 1 is a side view of a folding camera provided with an eccentric lens finder such as appears in Figs. 7ª and 7ᵇ of my said Case C, the finder elements being shown in vertical section. Fig. 2 is a perspective view on the transverse vertical plane D'D''' of Fig. 1 as perspective plane, and from the operator's eye $e$ as center of projection, so as to show how the finder image H'I'J'K' appears to the operator who sees it as a reduced positive picture situated directionally close by its original object in the camera field which is shown limited by the imaginary rectangle HIJK. Fig. 3 is a longitudinal section of a compound form of finder comprising a back removable lens element which is to be removed when a front removable lens element of the camera objective is removed for long focus work.

The camera proper is a folding bellows camera of the usual construction comprising a box 23; a hinged cover 19, which opens and locks at right angles to serve as camera bed; a bar 50 adapted to slide in and out on the bed 19; and a lens carrying frame 91, 92, 93, 94 which is adapted to be clamped to bar 50 after having been slid up into contact with the projecting lug 90.

Fastened to the upright 91 and base 92 of the lens carrying frame, by screws $u$, $v$, and $v'$, is a box-like frame comprising two vertical side walls $n$, $n$ connected at the rear by a vertical wall $t$ and, above, by a top wall X. The wall $t$, near the top, is provided with a rectangular opening 26, the height of which determines the angle beta ($\beta$) of rays that proceed from the finder lens to the operator's eye at $e$, Fig. 1.

The finder lens L in the present form consists in the upper eccentric part of a common bi-concave lens whose principal foci are at F' and F'', Fig. 1, and whose two nodal points are practically merged in the one point D, so that all refractions virtually take place in the vertical plane D'D'''.

The lens L forms, in its principal left hand focal plane F', a reduced image RS of the camera field whose angular value, twice gamma ($2\gamma$), is represented by angle BDQ. Image RS, being in the image space of the lens L, is seen by the eye $e$ as being included in the relatively small angle ReS or beta ($\beta$). The highest finder-to-eye ray RD''$e$, before refraction, proceeded along B'D'', parallel to BD. Similarly, the lowest finder-to-eye ray SD'$e$, before refraction, proceeded along Q'D' parallel to QD. Hence $e'$, meeting point of the two extreme incident rays B'D'' and Q'D' is the image of the operator's eye $e$ as visible in the finder to a person who is being photographed.

The middle finder-to-eye ray F'D°$e$ is the bisector of angle ReS, or beta ($\beta$), and it forms with the horizontal $e$D''' through the eye $e$ an angle D'''$e$F', or delta ($\Delta$), which represents what may be called the "drop," due to the eccentricity in the finder lens.

The camera field as viewed directly by the eye $e$ is included between $e$B'' parallel to DB and $e$Q'' parallel to DQ. The operator, therefore, sees the finder image H'I'J'K' Fig. 2, as being directionally located in the lower part of the camera field HIJK, whose central and most important part remains in full view along the horizontal direction $e$D''', Fig. 1.

Angle D'''$e$Q'', or gamma ($\gamma$), and angle D'''$e$B'', or gamma prime ($\gamma'$), are equal to each other, and their sum, twice gamma, is, of course, equal to angle BDQ.

The central sighting direction $e$D°F' is most easily determined as in the well known centric-divergent-lens finder or as in that of my Case B, Serial 42,957, filed January 12, 1901. In the present form of my invention, however, it is determined by fixing the direction of the incident central finder ray V''D° by means of the focuser prisms $c$ and P, which are fully described in my said Case C.

The lower prism $c$ is pivoted for focusing; but, as no attention is paid to focusing in the present application, Case Ah, we may consider this prism $c$ as stationary.

The left vertical face of prism $c$ has a cross (cross 24, Figs. 2 and 4, of my said Case C) whose central point is indicated in present Fig. 1 by a dot V. The mirror $c$ forms of dot V an image V', and the eye mirror P forms of image V' a second image V''. Image V'' here coöperates as bead sight with prism P as peep sight, substantially as explained in connection with Figs. 11 and 12 of my Case A, Serial No. 26,647, filed August 11, 1900.

When the operator has his eye in the proper position he sees the image V'' of Fig. 1, as in Fig. 2, located exactly at the middle of the peep P, at the center of the second cross image 24''. To facilitate the finding of this proper position of the eye the camera box 23 is provided with a small knob or round headed sight 25, which determines the vertical plane in which the eye must be located.

To correct the position of image V'' as may be necessary the prism P should have the two angular adjustments most clearly shown in Figs. 7$^a$ and 7$^b$ of my said Case C. One of these angular adjustments is made on a horizontal axis parallel to the principal axis of the camera lens and is produced by screws 60, 61; and the second of these two angular adjustments is made on an axis that is also horizontal but perpendicular to the first; that is to say, parallel to the camera plate or film, and such second angular adjustment is produced by shifting the bearing lug Y and clamping it by tightening screw 62.

Shifting lug Y causes the bead sight image V'' to rise or fall, whereas manipulating screws 60, 61, shifts it horizontally; and, therefore, the bead sight image V'' may be set, very accurately, wherever desired.

The object being photographed, in Fig. 2, is a fanciful design $d$ whose finder image usually comprises three parts, to wit: part $i$, visible in prism P, and the two complementary parts, $f$ and $f$, visible to the left and right of prism P.

As fully explained in my said Case C, (page 3, lines 81 to 128) part $i$ is the visible part of the image $i$, of object $d$ formed by the coöperation of the two mirrors $c$ and P with the finder lens L; and parts $f$ and $f$, are the visible parts of the image $f$, of object $d$, formed by the finder lens L acting alone.

The image $i$ is referred to in my Case C as the "movable image" which should register with image $f$ when the camera is in focus on the object $d$; but such registration, as explained on pages 3 and 4 of my said Case C, is dependent upon rotations of the reflector $c$ and other features that form no part of the present invention.

Fig. 3 shows a camera having a camera lens 81, 82 whose front element 82 is removable for long focus work as shown in dotted lines where the camera bed is provided with an extension 100.

The camera field in long focus work is about one-half as high and one-half as wide as in short focus work and my finder is, therefore, preferably made of two lenses $l$ and $l'$, one of which, $l'$, is removable to produce, in the finder field, the same reduction in the extent of field covered as in the camera field.

In short focus work the operator's eye is located at E and in long focus work it drops to E'.

NOTE 1.—The compound and separable finder seen in Fig. 3 is shown considerably improved in my Case J, Serial No. 246,169, filed February 17, 1905; but the present showing is strictly adhered to as being all that was fully disclosed in this connection by my said Case C, of which the present application, Case Ah, is a division.

Note 2.—I am aware that Clark in British Patent No. 10,915 of 1894 shows an eccentric divergent lens substantially the same as mine in general appearance; but Clark fails to show any means for directing the line of sight and overlooks the fact that the device which he calls a "prism" is identical with the eccentric part of a true lens and is subject to the same general optical laws as a lens. Moreover, he shows in his Fig. 2 a dotted line passing through his prism $m$ in such manner as to indicate that the central incident finder ray corresponding to my ray $V''D°$, Fig. 1, must be inclined, whereas my ray $V''D°$ is horizontal.

Note 3.—As my finder "drops" the image of a corresponding centric-divergent-lens finder it may be called a "drop-finder."

Note 4.—The finder offset $h''$ of Fig. 50 and page 18, of my Case A, now Patent 1,178,474, is considerably smaller in my "drop-finder" than it is in any corresponding "centric-divergent-lens finder" and this therefore constitutes a further advantage of my present invention.

What I claim as my invention and desire to secure by Letters Patent is:

1. The combination with a photographic camera, of a finder therefor, such finder comprising a divergent lens mounted on the camera with its axis substantially parallel to the axis of the camera lens; also means for directing the line of sight through the central point F' of the finder image and through an eccentric point of the lens.

2. The combination with a photographic camera, of a finder therefor, such finder comprising a divergent lens mounted on the camera with its axis substantially parallel to the axis of the camera lens; also means for directing the line of sight through the central point F' of the finder image and through an eccentric point of the lens; such directing means consisting in range points located in the region containing the incidental part of the finder rays.

3. The combination with a photographic camera, of a finder therefor, such finder comprising a divergent lens mounted on the camera with its axis substantially parallel to the axis of the camera lens; also means for directing the line of sight through the central point F' of the finder image and through an eccentric point of the lens; such directing means comprising range points, and means for adjusting the relative position of said range points to make the central part of the finder field as nearly as possible identical with the central part of the camera field.

4. The combination with a photographic camera, of a finder therefor, such finder comprising a divergent lens mounted on the camera with its axis substantially parallel to the axis of the camera lens; also means for directing the line of sight through the central point F' of the finder image and through an eccentric point of the lens; such lens being composed of at least two simple lenses, one of which is adapted to be removed to reduce the extent of the finder field for long focus work.

5. The combination with a photographic camera, of a finder therefor, such finder comprising a divergent lens mounted on the camera with its axis substantially parallel to the axis of the camera lens; also means for directing the line of sight through the central point F' of the finder image and through an eccentric point of the lens; said divergent lens being trimmed so as to limit it in size to the eccentrically utilized part thereof.

In testimony whereof, I have signed my name to this specification.

JOSEPH BECKER.

Copies of this patent may be obtained for five cents each, by addressing the "Commissioner of Patents, Washington, D. C."